(12) United States Patent
Berg et al.

(10) Patent No.: US 6,757,098 B2
(45) Date of Patent: Jun. 29, 2004

(54) HIGHLY SCALABLE MODULAR OPTICAL AMPLIFIER BASED SUBSYSTEM

(75) Inventors: Loren Berg, Richmond (CA); Mark R. Hinds, Ottawa (CA); Robert W. Keys, Stittsville (CA); Gregory D. May, Ottawa (CA); Alan G. Solheim, Stittsville (CA); Stephane St-Laurent, Santa Clara, CA (US)

(73) Assignee: Nortel Network Limited, Montreal (CA)

( * ) Notice: Subject to any disclaimer, the term of this patent is extended or adjusted under 35 U.S.C. 154(b) by 0 days.

(21) Appl. No.: 09/817,753

(22) Filed: Mar. 27, 2001

(65) Prior Publication Data

US 2003/0151802 A1 Aug. 14, 2003

Related U.S. Application Data

(63) Continuation-in-part of application No. 09/292,340, filed on Apr. 15, 1999, now Pat. No. 6,236,499.

(51) Int. Cl.[7] ............................................. H01S 3/00
(52) U.S. Cl. ............................ 359/341.2; 359/341.3; 359/124; 385/14; 385/31
(58) Field of Search .................... 359/341.3, 341.2, 359/124; 385/14, 31

(56) References Cited

U.S. PATENT DOCUMENTS

| | | | | |
|---|---|---|---|---|
| 5,083,874 A | * | 1/1992 | Aida et al. ................ | 385/24 |
| 5,113,459 A | * | 5/1992 | Grasso et al. ............. | 385/24 |
| 5,228,105 A | * | 7/1993 | Glista ....................... | 385/89 |
| 5,742,416 A | * | 4/1998 | Mizrahi ..................... | 398/92 |
| 5,748,363 A | * | 5/1998 | Duck et al. ............... | 359/341.1 |
| 5,812,306 A | * | 9/1998 | Mizrahi ..................... | 359/341.2 |
| 5,959,749 A | * | 9/1999 | Danagher et al. .......... | 398/83 |
| 5,995,259 A | * | 11/1999 | Meli et al. ................. | 398/92 |
| 6,038,046 A | * | 3/2000 | Kaneko et al. ............ | 398/1 |
| 6,055,092 A | * | 4/2000 | Sugaya et al. ............. | 359/337 |

FOREIGN PATENT DOCUMENTS

| | | | |
|---|---|---|---|
| EP | 0440276 | * | 8/1991 |
| EP | 0844757 | * | 5/1998 |
| WO | 98/49794 | * | 11/1998 |
| WO | 98/52314 | * | 11/1998 |

\* cited by examiner

*Primary Examiner*—Stephen C. Buczinski
(74) *Attorney, Agent, or Firm*—Foley & Lardner

(57) ABSTRACT

A modular bidirectional optical amplification system includes a multiwavelength dual amplifier building block, a multiwavelength unidirectional booster amplifier BB, a unidirectional and a bidirectional Optical Service Channel (OSC) BB, an Intelligent Optical Terminal Accessway (IOTA) module, and an interleaved filter BB. The dual amplifier BB is available in a C-band version, an E-band version and a hybrid version, and provides unidirectional or bidirectional multichannel amplification. The booster amplifier is available in a C-band version, an E-band version and in a booster plus variant; one for the C-band and one for E-band. The unidirectional and bidirectional OSC BBs provide a means for OAM&P functionality to the optical network. The IOTA BB provides multiplexing and demultiplexing, and the filter BB provides separation of the signal into grid-1 and grid-2 channels.

7 Claims, 19 Drawing Sheets

HIGHLY SCALABLE MODULAR OPTICAL AMPLIFIER BASED SUBSYSTEM

This is a continuation in part of U.S. Ser. No. 09/292,340 now U.S. Pat. No. 6,236,499, filed on Apr. 15, 1999, entitled "A Highly Scalable Modular Optical Amplifier Based Subsystem".

BACKGROUND OF THE INVENTION

1. Field of the Invention

This invention is directed to optical amplification in communication networks and more particularly to a highly scalable modular optical amplifier based subsystem.

2. Background Art

To achieve long haul optical transmission, regenerators (repeaters) and/or optical amplifiers are deployed along the optical transmission line in multiple locations, for boosting the signal on the fiber. For systems operating at data rates of GBps, regenerator sites could be spaced in the range between 35 to 80 Km, depending on the wavelength chosen for transmission. The distance between optical amplifiers may be almost doubled, being in the range between 80 to 160 km.

Optical amplifiers are based on a length of Erbium doped fiber (active fiber) pumped with light of a certain wavelength to amplify the optical signal passing through the amplifier. The active fiber is spliced in the optical fiber. An important element is the WDM coupler, which performs the function of coupling the pump source lager wavelength to the Erbium doped fiber. Optical amplifiers may also be bidirectional, in which case they use a pump for each direction of transmission, with the respective WDM couplers. Optical isolators are also used internal to an optical amplifier, for reducing reflections generated at the points of fiber discontinuities, such as couplers, splitters, etc.

Optical amplifiers are favoured in long-distance systems over electrical repeaters not only because they allow for longer distances between the modules, and can be easily spliced into the fiber transmission link, but more importantly, because they do not require optical/electrical and electrical/optical conversion. An optical amplifier can amplify multiband/multichannel optical signals without demultiplexing them, thereby avoiding the costs of multiple optical receivers, multiple regeneration circuits and multiple optical transmitters. Also, they amplify whatever bit rate comes down the fiber. Even if the transmission rate is boosted, the device will not need to be replaced.

Current optical amplifiers are equipped with power monitors which control the pump based on measurements of the output and sometimes input signals. The measurement is effected by providing an optical tap coupler on the respective output and input optical signal and diverting a fraction (generally 3–5%) of the respective input and output signals to the monitor.

The 80 km limitation can be extended with the introduction of external modulation and use of dispersion shifted optical. WDM and dense WDM (DWDM) technologies reduce the strands of optical fiber cable needed to establish a communication link, and provide manifold capacity expansion on existing fiber links. In addition, the advances in fiber technology now permit optical amplifiers to work not only in the conventional band (C-band) of 1530–1563 nm, but also in an extended band (E-band) of 1570–1603 nm.

The number of amplifiers required for working and protection spans, the type of the optical amplifiers, and the number of wavelengths carried within the system are significant issues must be considered when designing multiband/multichannel transmission systems. As the optical amplifiers evolve in performance and functionality, so does their cost. Evolution of the network, e.g. in terms of bandwidth growth must also be taken into consideration. Currently, network providers use over-performing optical amplifiers than necessary at the first stage of network deployment for allowing for future growth.

The optical amplifiers available on the market accommodate up to 16 bands bidirectionally. These amplifiers are exclusively for bidirectional or unidirectional systems and are relatively inflexible to create various complex amplifier topologies. There are three types of optical amplifiers: post-amplifiers that connect to a transmitter to boost the output power; line amplifiers connected along a route between the transmitter and the receiver, and pre-amplifiers that improve the sensitivity of optical receivers. These different types of amplifiers provide different output powers, use different input power levels, and generally have different noise figure requirements. Being stand-alone units, they allow the network with little opportunity for growth or scalability, in that they must be replaced whenever the demand for bandwidth increases.

SUMMARY OF THE INVENTION

It is an object of the invention to provide a highly scalable modular optical amplifier based subsystem, which solves totally or in part the drawbacks of the prior art optical amplifiers.

It is another object of the invention to provide a highly versatile, scalable and modular family of optical amplifier building blocks that can be arranged in a variety of ways to produce both unidirectional and bidirectional topologies.

The building blocks or modules of the optical amplifier architecture are intended to operate in a modular manner exploiting the entire conventional Erbium gain window (1530 nm–1563 nm) as well as the extended Erbium band (1570 nm–1603 nm). Used together, this set, or family of products can produce optical amplifier topologies which can either be unidirectional or bidirectional, which also offer scalability with respect to the number of wavelengths deployed. The modules or building blocks are compatible with the current Northern Telecom Limited S/DMS TransportNode™ products, and could be mapped into the existing shelves. It is expected that the equipping restrictions, mostly surrounding the OSC circuit pack, need to be employed due to hardware or software limitations, or to simplify system operation and verification. These restrictions will be documented in the equipping rules for the appropriate S/DMS TransportNode OC-192 releases.

According to one aspect of the invention, there is provided an optical amplification system comprising, a dual optical amplifier building block for bidirectional amplification of a plurality of optical channels propagating along a first and a second transmission line, an optical service channel (OSC) building block operatively connected to said dual optical amplifier building block for transmitting and receiving service information over a first and a second service channel, and a first Raman source of optical power connected at the input of said dual optical amplifier on said first transmission line for back pumping light.

According to a further aspect of the invention, there is also provided, an optical amplification system comprising, a dual optical amplifier building block for bidirectional line amplification of a plurality of optical channels propagating along a first and a second transmission line, an optical service channel (OSC) building block operatively connected to said dual optical amplifier building block for transmitting and receiving service information over a first and a second service channel, a first booster optical amplifier building block connected on said first transmission line at a first output of said dual optical amplifier building block, a second booster optical amplifier building block connected on said second transmission line at a second output of said dual optical amplifier building block, a grid-1 filter, connected between said first output and said first booster optical amplifier building block, a grid-2 filter, connected between said second output and said second booster optical amplifier building block, a first Raman source of optical power connected at the input of said dual optical amplifier on said first transmission line for back pumping light, and a second Raman source of optical power connected at the input of said dual optical amplifier on said second transmission line for back pumping light.

The invention further includes an optical amplification system comprising, an optical multiplexer for multiplexing a plurality of optical signals received over a plurality of input transmission lines and providing a forward multichannel optical signal, a dual optical amplifier building block for amplifying said forward multichannel optical signal and amplifying a reverse multichannel optical signal, an optical demultiplexer for receiving said reverse multichannel optical signal and separating same into a plurality of optical channels for transmission over a plurality of transmission lines, an optical service channel (OSC) building block operatively connected to said dual optical amplifier building block for transmitting and receiving service information over an optical service channel; a first Raman source of optical power connected at the input of said dual optical amplifier on said first transmission line for back pumping light, and a second Raman source of optical power connected at the input of said dual optical amplifier on said second transmission line for back pumping light.

The main advantage of the scalable and modular architecture according to the invention is the ability to provide a choice of optical amplifier architectures that may be adapted to the current need of the optical network and that scales as the bandwidth demand grows.

BRIEF DESCRIPTION OF THE DRAWINGS

The foregoing and other objects, features and advantages of the invention will be apparent from the following more particular description of the preferred embodiments, as illustrated in the appended drawings, where:

FIG. 1b illustrates the symbol for the optical amplifier of FIG. 1a;

FIG. 2b illustrates the symbol for the dual optical amplifier BB of FIG. 2a;

FIG. 4b illustrates the symbol for the unidirectional OSC of FIG. 4a;

FIG. 5b illustrates the symbol for the bidirectional OSC BB of FIG. 6a;

FIG. 7b illustrates the symbol for a filter of FIG. 7a;

DESCRIPTION OF THE PREFERRED EMBODIMENT

Some terms are defined next for better understanding of the invention.

An optical multiplexer (Mux) is a network element that multiplexes a plurality of optical client signals, each carried by a wavelength (channel), into a multichannel optical signal. An optical demultiplexer (Demux) effects the reverse operation, namely it separates the individual channels form the multichannel signal, according to their wavelength. A Mux/Demux generally comprises a combination of optical filters coupled to each other, each for selectively reflecting or transmitting a certain wavelength. The optical elements are generally packaged separately from the transmitter or receiver optics, or from any optics that may be present at the network node.

An optical add/drop multiplexer (OADM) directs one or more individual channels of the optical multichannel signal to local users (drop channels), while the remaining channels are passed directly from the input to the output (passthrough or express channels). Add channels may also be inserted at an OADM site. An OADM may include a 1×N demultiplexer filter, followed by a N×1 multiplexer filter. The first filter element demultiplexes the frequency components (the channels) of the input WDM signal into N waveguide ports. A channel of interest is dropped to a local receiver, by optically connecting the corresponding port to the receiver.

The second filter element multiplexes the remaining N−1 channels with a new channel into the fiber output. The new channel may nominally have the same frequency as that of the dropped channel and is added to the filter output by the unused port of the multiplexer. The frequency reuse capability of this type of ADM filter is an essential feature for maximizing the performance of a WDM optical ring network.

A WDM coupler is used for combining two multichannel signals, or two channels, or for adding a channel to a multichannel signal. A WDM coupler is also used for separating a channel or a band from a multichannel signal.

Typically, access to the SONET overhead is not available at an OA site, because the SONET payload is not terminated by optical amplifier equipment (no electrical conversion). An optical service channel (OSC) is employed to address this limitation by providing a subset of SONET overhead on an out of Erbium band wavelength. OSC could be unidirectional or bidirectional, according to the type of traffic. Some examples of the payload carried by this channel are a Data Communication Channel (DCC). Orderwire bytes (E1 and E2), a DS-1 Wayside channel, and propriety bandwidth employed for power optimization schemes. This channel operates at 4.86 Mb/s Manchester encoded at 1510 nm and 1480 nm.

Figure 1A:
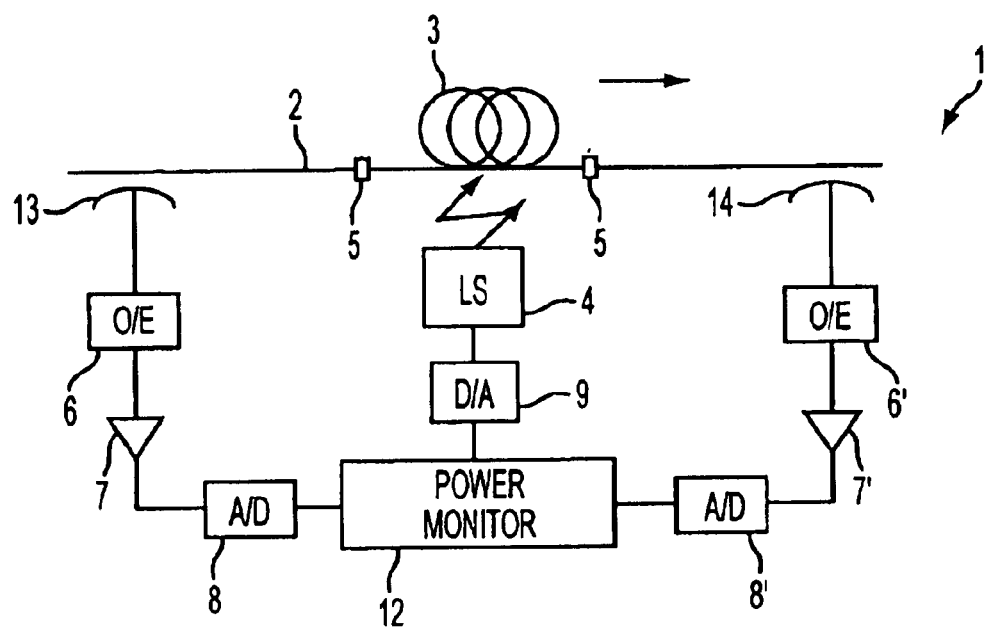
FIG. 1a illustrates a unidirectional multiwavelength optical amplifier.

FIG. 1a shows a block diagram of a unidirectional optical amplifier 1. In general, an optical amplifier comprises an Erbium doped fiber amplifier (EDFA) 3 optically connected in fiber 2 using connectors 5, for amplifying light (a channel or more) received at the input. EDFA 3 is powered by a light source 4 (a laser). A power monitor 12, receives a fraction of the input and output signals and controls accordingly the laser. Taps 13 and 14 divert the fraction of the signal on fiber 2, optical-to-electrical converters 6 and 6' convert the respective fractions to electrical signals, which are thereafter amplified by transimpedance amplifiers 7 and 7' in the known way. Capacitors C1 separate the dc component and the A/D and D/A converters 8, 8' and 9 provide the power monitor and respectively be light source with the corresponding type of signal. It is to be understood that this a general overview, the optical amplifier being in general provided with additional controls, some with analog maintenance tones, etc., which are not illustrated for simplification, and also as these functions are not relevant to the present invention.

Figure 1B:
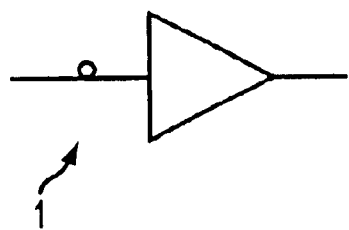

FIG. 1b shows the symbol for a unidirectional optical amplifier 1 which includes gain control or transient suppression.

Unlike the existing family of optical amplifiers, the optical amplifier packages according to the invention operate in a modular manner, exploiting the entire conventional Erbium gain window, known as band C, as well as the extended Erbium gain window, known as band E. This family of products produces unidirectional or bidirectional optical amplifier topologies, also offering scalability with respect to the number of wavelengths deployed.

In this specification, the terms "module", "package" and "building block (BB)" are used to define a stand-alone optical package performing a certain function.

The basic modules for the new OA topologies are shown in FIGS. 2 to 8. Since it may not be readily apparent how these various modules inter-work, a set of applications are presented in FIGS. 9 to 14.

The basic modules that form the MOSAIC family are:
1. A multiwavelength unidirectional amplifier pair;
2. A multiwavelength unidirectional booster amplifier;
3. A multiwavelength unidirectional booster plus amplifier;
4. An extended band (e.g. 1570–1603 nm) version for each of the above amplifier circuit packs, which can be used for unidirectional or bidirectional overlays or within a true bidirectional system;
5. A unidirectional Optical Service Channel (OSC) circuit pack which provides a means for OAM&P functionality to the optical network. A bidirectional OSC is also available for bidirectional systems;
6. An Intelligent Optical Terminal Accessway (IOTA) set of circuit packs
7. Interleaved filter circuit packs, one for the C-band and one for E-band;
8. Raman pump modules for the C-band and E-band.

Figure 2A:
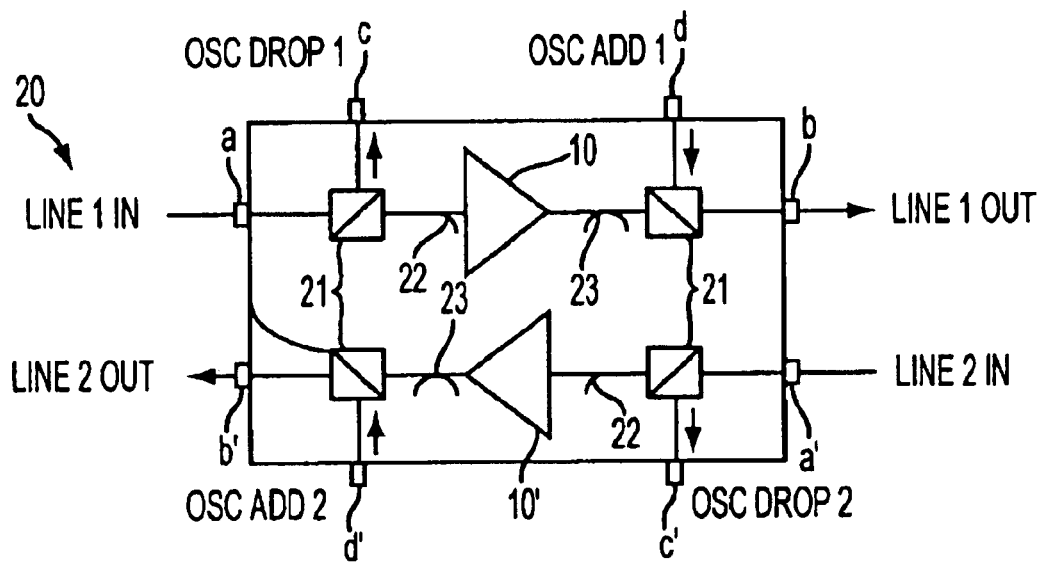
FIG. 2a illustrates a dual amplifier building block (BB)

FIG. 2a illustrates a dual amplifier circuit package 20 according to the invention, which includes two optical amplifiers 10 and 10'. It is anticipated that dual nature of this circuit package will be fully exploited in the early stages of network deployment (day one), because of the demand for bidirectional flow of the traffic in modern networks.

The dual amplifier module is manufactured in a number of versions, each for use according to a specific application. A C-version is for the conventional Erbium optical bandwidth, a sister E-version spans the extended Erbium band, and a hybrid H-version which comprises both a C and an E band amplifier for use in bidirectional systems.

The package 20 includes unidirectional amplifiers 10, which are provided with gain control for transient suppression. This feature allows the amplifier to deal with both expected and unexpected additions or drops of one or a number of wavelengths in a WDM environment with the ultimate goal of maintaining the original wavelengths unperturbed. The amplifiers have also a low noise figure, while providing a relatively low cost entry offering while offering a platform for future scalability.

Connectors designated by a, b, a', b', c, d, c' and d' are faceplate connectors for the Line-1 In, Line-1 Out, Line-2 In, Line-2 Out, OSC Drop 1, OSC Add 1, OSC Drop 2, and OSC Add 2, respectively.

WDM couplers 21 are used for add/drop of the OSC channel to the input and output of each amplifier 10, 10'.

In addition, the package is provided with optical tap couplers 22 and 23. Tap 22, at the input of the amplifiers, diverts a fraction from the input traffic, while tap 23, at the output of the amplifiers, is a bidirectional tap for diverting fractions from both directions. The signals collected at the taps are used for power monitoring, analog maintenance, equalization, testing, and reflection detection.

Figure 2B:
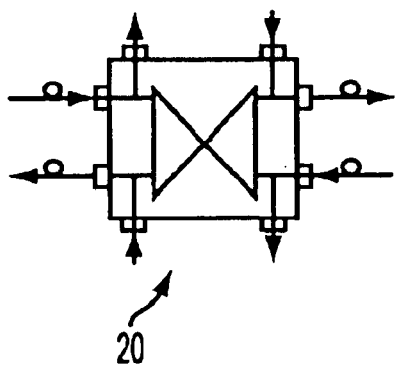

FIG. 2b illustrates the symbol for the dual optical amplifier module of FIG. 2a.

Figure 3:
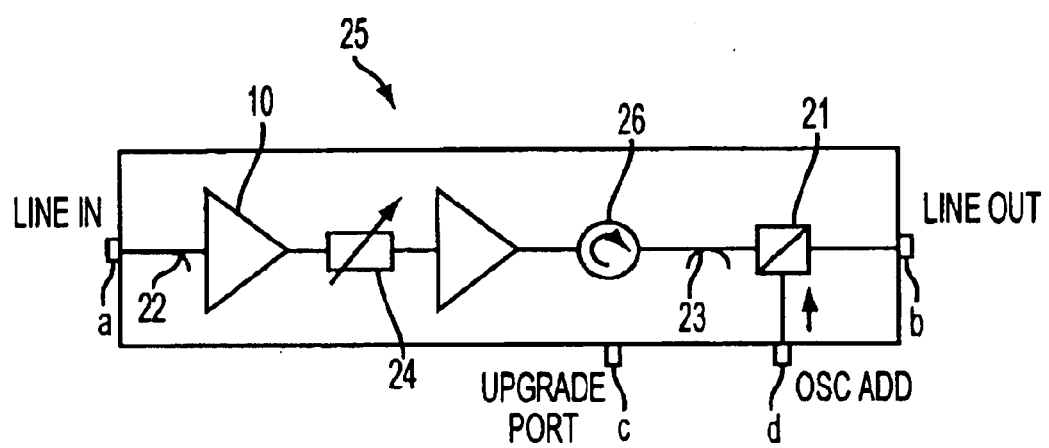
FIG. 3 illustrates a booster amplifier BB.

FIG. 3 illustrates a booster amplifier package 25. The BB comprises a multiple pumped EDFA (Erbium doped fiber amplifier) 25, which provides a substantial increase in optical output power for booster amplifier applications where large output powers are required. The booster amplifier package also contains an embedded variable optical attenuator (VOA) 24 for controlling the gain tilt. In other words, the function of the VOA is to keep the amplifier operating at its design flat gain, thereby mitigating the undesirable effects of gain tilt. The package is also provided with gain control for transient suppression, and with an output circulator 26 which acts as an output isolator as well as an upgrade port for an interleaved filter bask amplifier topology as it will be seen later.

Optical circulators use polarization properties of light and they are directional. Thus, the multichannel signal while travels within the circulator from port to port in one direction only, and channels are added and dropped at different ports.

The amplifier 25 is also provided with taps 22 and 23. The booster amplifier package family offers a booster amplifier version, a booster-plus amplifier version, a C-version and a sister E-version. The difference between the booster amplifier and the booster-plus amplifier is that the later offers significantly more output power than the former.

Figure 4A:
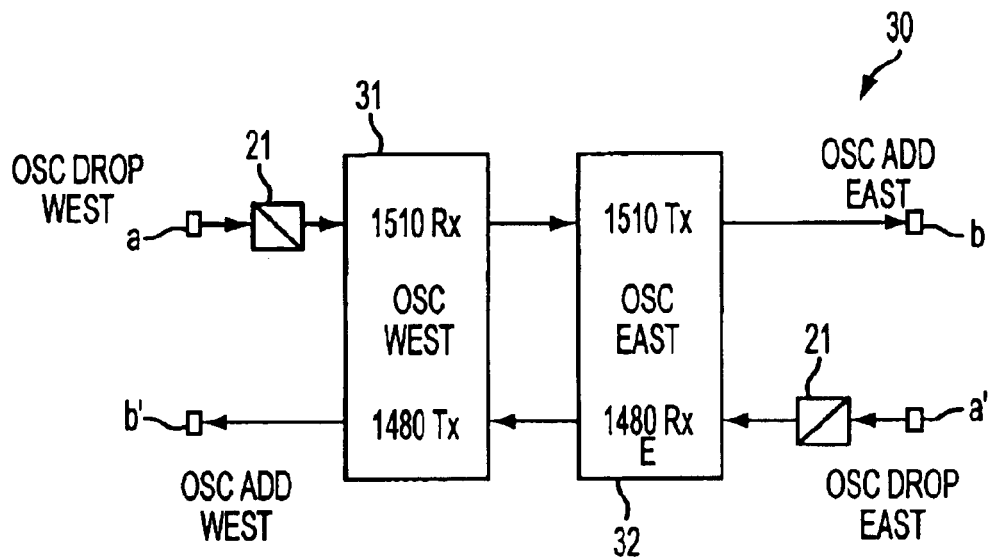
FIG. 4a illustrates a unidirectional optical service channel (OSC) module.

FIG. 4a illustrates a unidirectional optical service channel (OSC) module 30 which supports OAM&P capability at optical transport platform network elements. Module 30 is capable of accessing two OSCs, one at 1510 nm and the other at the 1480 nm. The package comprises a West OSC 31, with the receiver for the first OSC and the transmitter for the second OSC. The East OSC 32 comprises the transmitter for the first OSC and the receiver for the second OSC. Each channel is accommodated on a separate fiber, so that the package comprises four faceplate connectors a and b for the first channel and a' and b' for the second. The package also comprises WDM couplers 21 for the East and West drop, used for the bidirectional OSC package.

Figure 4B:
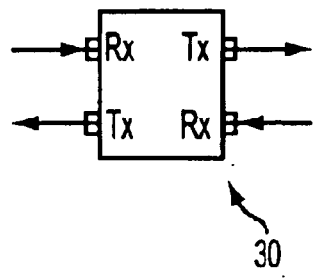

FIG. 4b shows the symbol for the unidirectional OSC package. The OSC circuit package is also offered as a bidirectional OSC 35 with only two faceplate optical connectors a and b, for use in a true bidirectional system. This circuit pack is represented schematically in FIG. 5a.

The unidirectional OSC and bidirectional OSC circuit packages provide the amplifier group with OAM&P functionality. One of these packages is mandatory in the formation of an optical amplifier group and it acts as a foundation and communication port for that group. In a network, the OSC module does not offer protection switching of the OSC channel, but rather offers a redundant OSC channel which is running on the SONET protection path. Therefore, where SONET traffic flows so must an OSC channel.

The OSC BBs also allow for versatile card placement of all other members of the family within a bay, since this is the only member of the family which has any slot requirements.

Figure 5A:
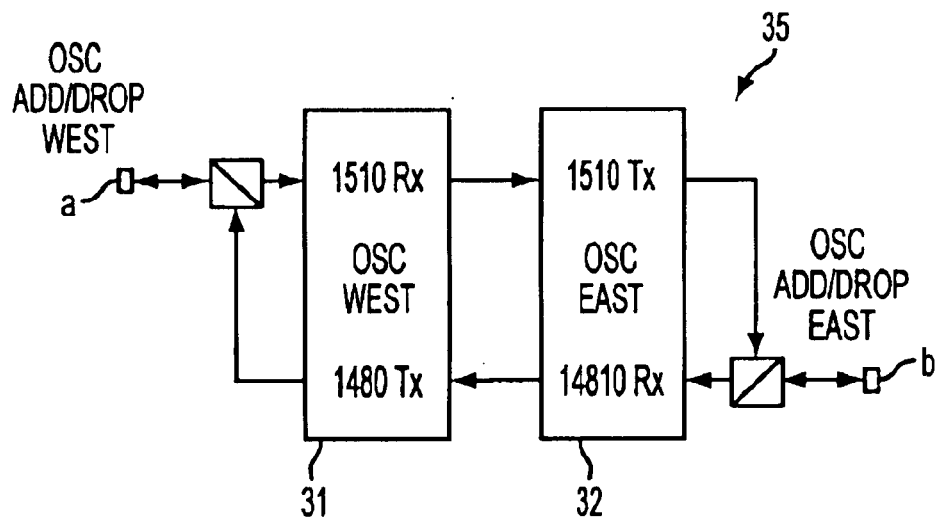
FIG. 5a illustrates a bidirectional optical service channel (OSC) BB.
Figure 5B:
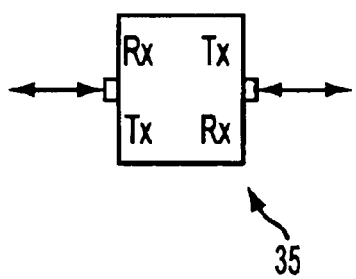

FIG. 5b illustrates the symbol for the bidirectional OSC of FIG. 5a.

Figure 6:
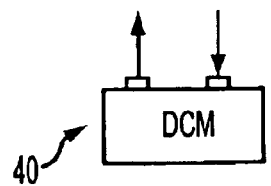
FIG. 6 illustrates the symbol for a dispersion compensation module (DMC)

FIG. 6 illustrates the symbol for a dispersion compensation module (DCM) 40, which compensates for fiber dispersion.

Figure 7A:
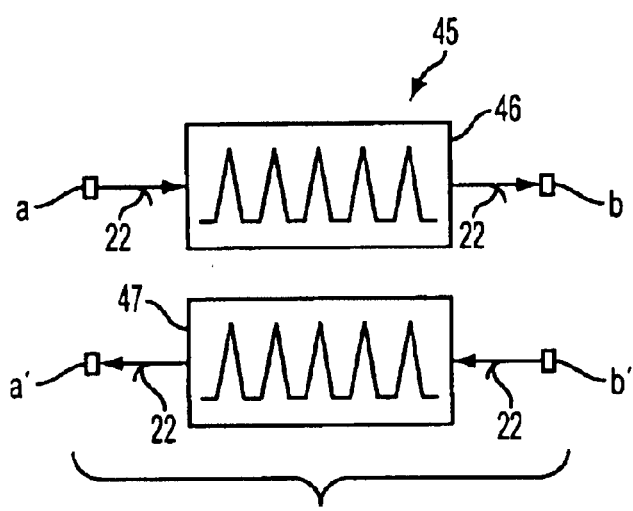
FIG. 7a illustrates the filters BB with a grid 1 and grid 2 filters.

FIG. 7a illustrates an interleaved filter package 45, which includes an even filter 46 (grid-1) and an odd filter 47 (grid-2) in the same package. The filter has a FSR free spectral range (FSR) of 100 GHz for 50 GHz on fiber. The grid-1 46 filter supports 40 wavelengths on the 100 GHz ITU grid, and the grid-2 filter 47 supports another 40 wavelengths offset by 50 GHz.

This BB family comprises a C-variant and a sister E-variant, including a pair of filters for the E band. The filter packages 45 are provided with performance monitoring through analog maintenance (AM), whereby each channel carries its unique identification.

Figure 7B:
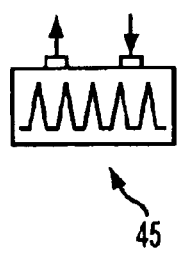

FIG. 7b illustrates the symbol for a filter 46 or 47 of FIG. 7a.

Figure 8A:
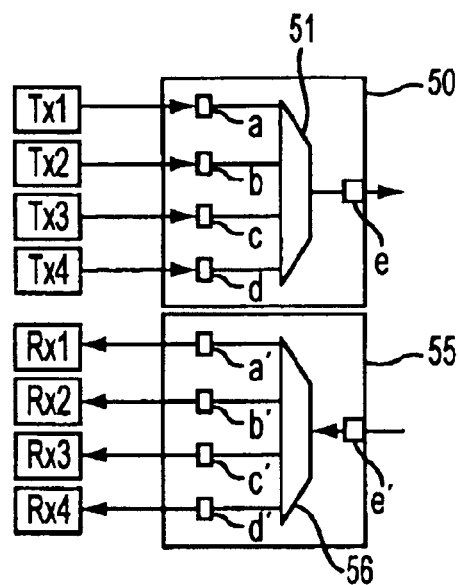
FIG. 8a shows the symbol for an intelligent optical terminal accessway (IOTA) multiplexer and demultiplexer BB.
Figure 8B:
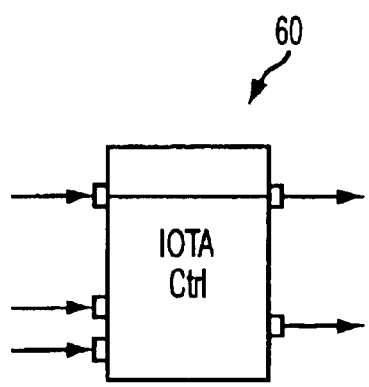
FIG. 8b shows the symbol for the an intelligent optical terminal accessway.

FIGS. 8a and 8b illustrate the symbol for the intelligent optical terminal accessway (IOTA). This family of BBs provides termination access to a network replacing the current passive filter multiplexer/demultiplexer solution. It consists of three circuit packages, a multiplexer 50, a demultiplexer 55 and a controller 60.

The multiplexer circuit package 50 provides individual transmitter inputs a–d. Each input has a power monitor and controlled VOA capability (not shown). An internal filter 61 multiplexes all transmitter inputs onto a single output. The demultiplexer circuit package 55 provides individual receiver outputs a'–d'. An internal filter 56 demultiplexes the single fiber input onto the individual outputs. Controller circuit package 65 provides communication to the network via OSC, and operates as a controller for the three circuit packages. The controller 65 includes AM monitoring of the multiplexer output. The multiplexer 50, demultiplexer 55 and controller 60 packages can communicate to the other IOTA circuit packages.

The modules shown in FIGS. 2–9 are designed as global transport products, and are therefore compatible with both SONET and SDH standards. Any discussion of SONET OC-N interfaces in this specification also implies references to SDH STM-N/3 interfaces.

The modules shown in FIGS. 2–9 maintain the same level of compatibility with the existing Applicant's products of S/DMS TransportNode™ OC-48 and S/DMS TransportNode™ OC-192 families, and some compatibility with the bidirectional multiwavelength OC-192 optical amplifier (MOR) currently produced by the applicant. For example, existing MOR system can benefit with E-band upgrades.

Since the family of products disclosed herein has scalability as a central goal, it is designed to incorporate in a seamless manner future amplifier products and future optical components and technologies into future optical network solutions. The majority of these future solutions will strive towards higher density WDM applications and more complex link compensation techniques.

As indicated above, the family of modules described in connection with FIGS. 2–9 offers the network providers with the opportunity to evolve a network from an initial simple configuration of a relative low cost to more complex configurations.

Some configurations and upgrade paths using the above BBs are presented in the sections below. It should be stressed that the upgrades target an increase in optical power which translates in most cases to an increase in the number of wavelengths. Also it is to be stressed that the use of unidirectional OSC circuit package 30 in a unidirectional system and the use of a bidirectional OSC circuit pack 40 in a bidirectional system is necessary for providing the configuration with OAM&P capabilities.

The configurations below illustrate only working traffic and a single direction of transmission. It is to be understood that similar combinations of modules may be used for the other direction, and for the protection traffic.

Figure 9A:
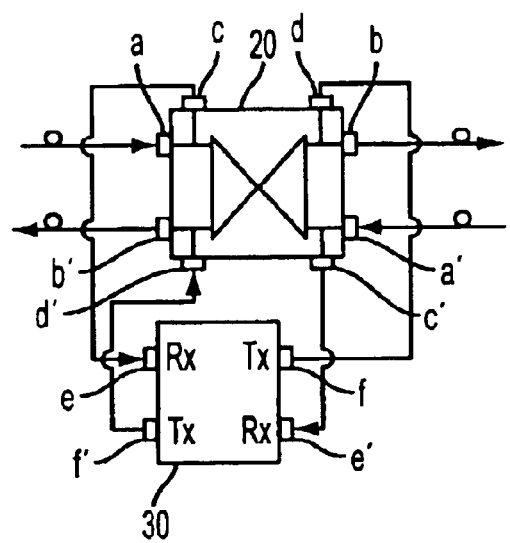
FIG. 9a illustrates a line amplifier configuration (LA-1) using BBs of the modular optical amplifier subsystem.
Figure 9B:
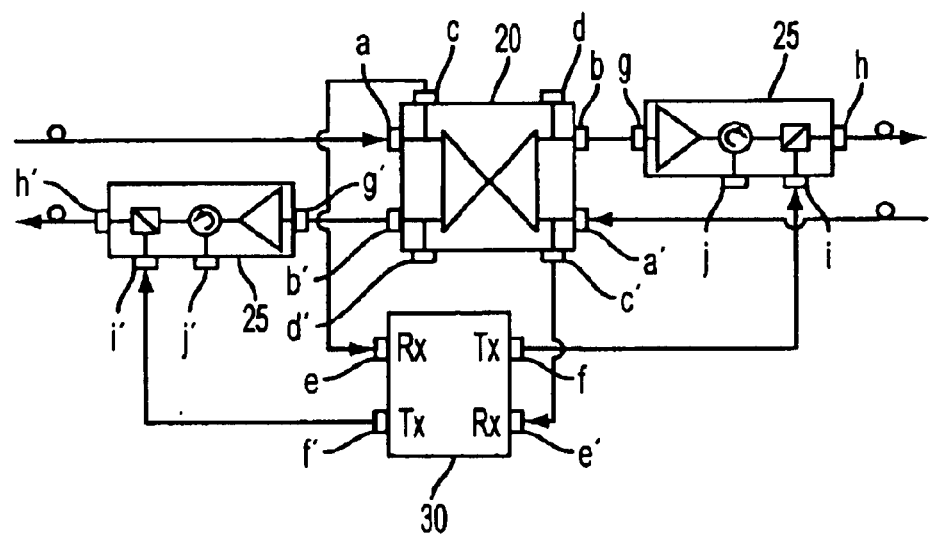
FIG. 9b illustrates another LA configuration (LA-2), which is a direct upgrade of configuration LA-1.
Figure 9C:
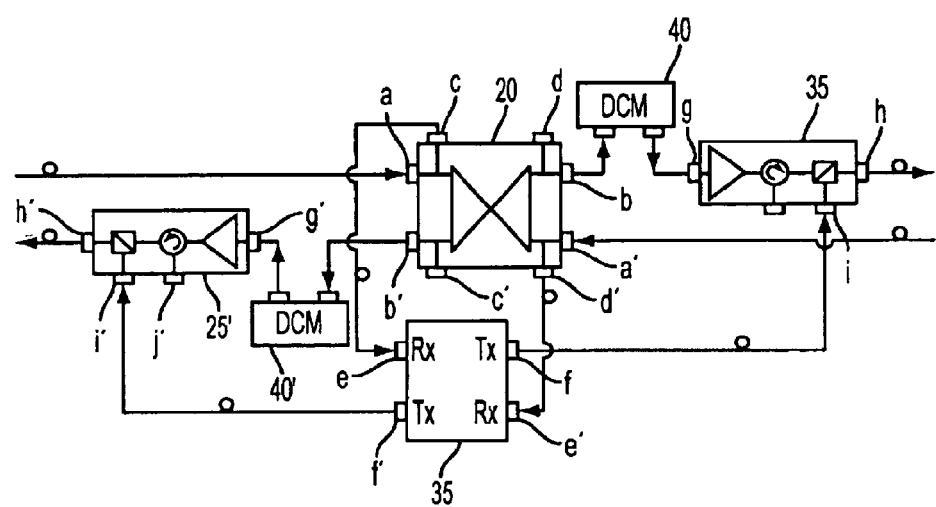
FIG. 9c illustrates still another LA configuration (LA-3), which utilizes the mid-stage access capability.

FIGS. 9a, 9b and 9c illustrate line amplifier configurations. In a line amplifier configuration, there is no electrical regeneration of toe SONET signal and visibility to this network element can only be achieved through the OAM&P capabilities of the OSC, or via an independent Ethernet link to the respective NE. If midstage access is provided at a line amplifier site, then dispersion compensation techniques, wavelength equalization, or add/drop multiplexing can be employed without affecting overall link performance.

The configuration shown in FIG. 9a (LA-1) illustrates the lowest cost implementation of a line amplifier site with just employing the dual amplifier module 20 and a unidirectional OSC module 30. Module 30 is connected with ports e and f to the add/drop ports c, d of the dual amplifier BB 20. Thus, the receiver of the OSC West 31 receives the first OSC dropped at the West input of dual amplifier 20, while the transmitter of the East OSC module 52 inserts the first OSC channel at the East output of the dual amplifier BB 20.

Module 30 is also connected with ports e' and f' to the add/drop ports c', d' of the dual amplifier BB 20. In this ways the receiver of the OSC East 32 receives the second OSC dropped at the East input of dual amplifier 20, while the transmitter of the West OSC module 51 inserts the second OSC channel at the West output of the dual amplifier BB 20.

FIG. 9b illustrates a second line amplifier configuration (LA-2), which is a direct upgrade of configuration LA-1. Configuration LA-2 is used when there is a need to increase the number of wavelengths, and therefore the launch power, by including booster amplifiers 25 and 25' at a respective East and West output. Different levels (number of pumps) of booster amps can be added, depending on the new number of wavelengths to be supported. The connections for the drop side of the dual amplifier 20 (c-e and c'-e') remain unchanged. However, the OSC 30 must now be added at a different point, i.e. at the output of the respective booster amplifier, as shown by connections f'-i' and f-i.

FIG. 9c illustrates a third line amplifier configuration (LA-3), which utilizes the mid-stage access capability in the configuration of FIG. 9b. One use for midstage access is dispersion compensation. DCMs 40 and 40' could be connected at the output of each line, before the respective booster amplifier 25 and 25'. More precisely, DCM 40 is inserted between b and g, and DCM 40' is inserted between b' and g'. In this case, for the add side, the transmitters of the OSC BB 30 are connected to ports i and i' of the respective booster amplifier 25, 25'.

It should be noted that the booster plus amplifier could also be employed as a substitution of, or an augmentation of the booster amplifier that is illustrated in FIG. 9c.

Figure 10A:
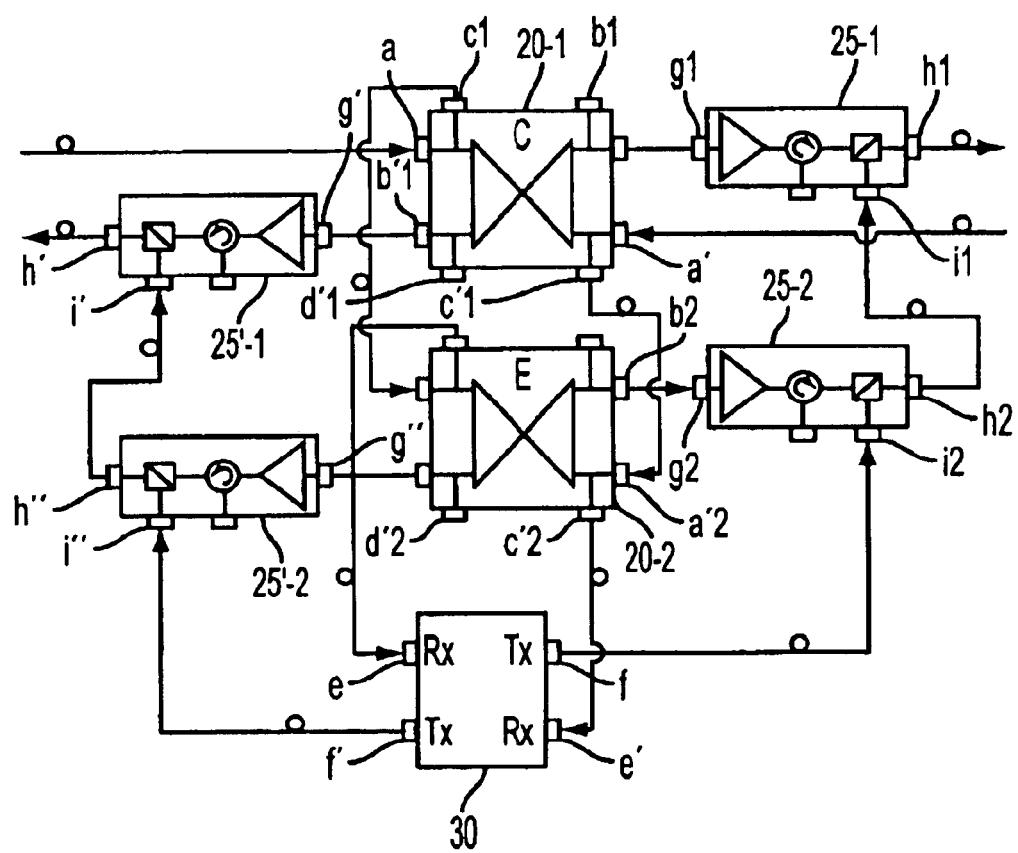
FIG. 10a illustrates a C and E band dual amplifier BB in a unidirectional overlay.
Figure 10B:
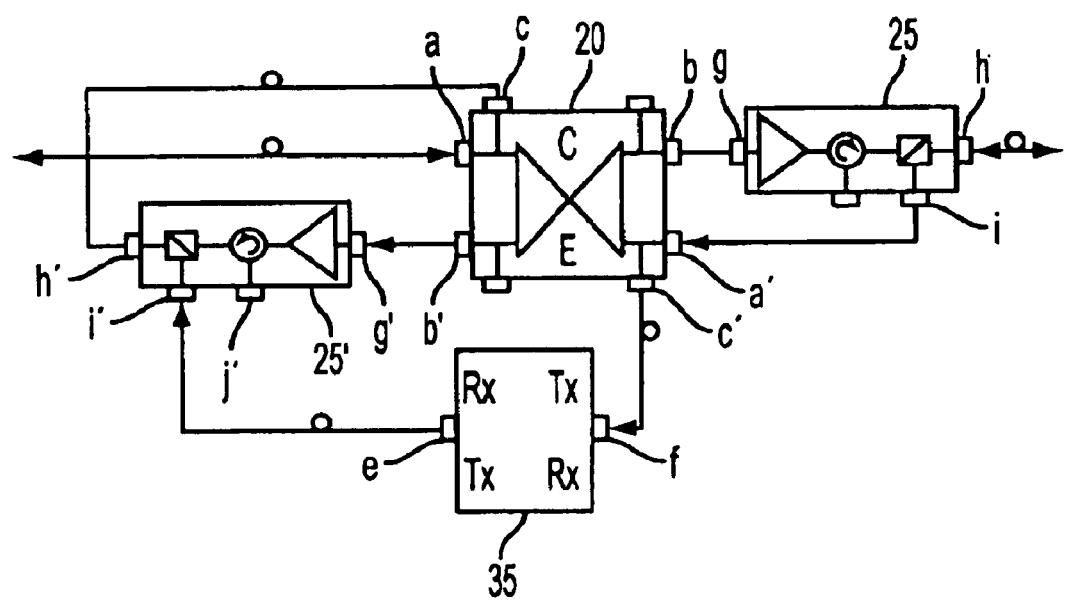
FIG. 10b illustrates a C and E band dual amplifier BB in a bidirectional overlay.

Further upgrades of the line amplifier configurations are shown in FIGS. 10a and 10b which illustrate how the E-band modules are integrated with the C-band modules to produce unidirectional or bidirectional topologies in order to scale an existing network.

When E-band EDFAs are used in conjunction with C-band EDFAs, a usable gain bandwidth of over 60 nm can be achieved. This would equate to 80 at 100 Hz spacing. Such a configuration is shown in FIG. 10a where a dual C-band amplifier BB 20-1 is connected in parallel to an E-band dual amplifier BB 20-2. Namely, the multichannel signal received at West input port a of amplifier 20-1 is separated into channels in C-band and in E-band. Amplifier 20-1 amplifies the C-band channels. The channels at output b1 of the amplifier 20-1 are further boosted by booster amplifier BB 25-1. Similarly, amplifier 20-2 amplifies the E-band channels, which are further boosted by booster amplifier BB 25-2 connected at the output b2 of the amplifier 20-2. The C-band and E-band channels of the second line are processed in a similar way.

The booster amplifiers at a respective East and West output are connect in series. Namely, port h2 is connected with port i1 so that the C-band boosted output is added with the E-band boosted output to obtain the output on the first line. Port h" is connected with port i' so that the C-band boosted output is added with the E-band boosted output to obtain the output on the second line.

In this configuration, the unidirectional OSC BB 30 is connected at the drop ports of the E-band amplifier, and at the add ports of the respective booster amplifiers 25-2 and 25'-2, i.e. the OSCs are processed by the E-band equipment.

The C and the E-band amplifiers can also be combined to produce a true-bidirectional system where the working channel is carried on just one fiber. FIG. 10b illustrates a C and E-band dual amplifier BB 20 in a bidirectional amplifier overlay. Port a of dual amplifier BB 20 is the input for the C-band channels and the output for the E-band channels, while port h of booster 25 is the input for the E-band channels and the output for the C-band channels.

The configuration of FIG. 10b is also provided with booster amplifiers 25 and 25', for allowing bidirectional amplification of a large number of channels. The booster amplifier BBs are connected as in the previous cases at the output of the respective amplifier.

In this case the BiOSC module 35 needs to be used, since only one fiber is available for the working channel. BiOSC is processed with the E-band channels.

The bidirectional amplified system of FIGS. 10a and 10b is based on a bond segmentation scheme. Such a scheme is implemented by the dissection of an otherwise continuous optical bandwidth into two or more sub-bands. The sub-bands are then amplified and/or compensated separately and therefore independently. The inherent drawback of a band segmentation scheme is an unusable dead band, which acts as a guard band, between each of the sub-bands therefore wasting optical bandwidth.

Another option for deploying dense WDM systems in a bidirectional system is to transmit an interleaved set of channels. In the interleaved approach, every other optical channel on a 50 GHz grid travels in one direction, while the remaining channels travel in the opposite direction. The advantage of this technique is that it allows for 100 GHz channel spacing in any one direction, and does not suffer from any dead band, which is inevitably imposed by a band segmentation.

Figure 11A:
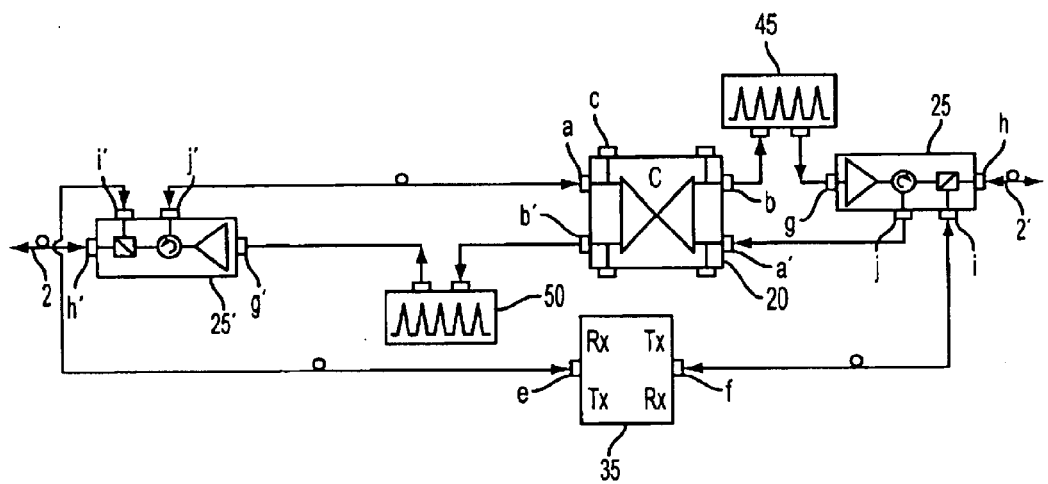
FIG. 11a illustrates a bidirectional amplifier topology.

FIG. 11a illustrates a bidirectional amplifier topology using interleaved filters. In this configuration, the main fiber 2-2' carries the grid-1 channels in the West-to-East direction and the grid-2 channels in East-to-West direction. A booster 25-2 is connected to the West fiber 2 and a booster 25-1 is connected to the East fiber 2'.

Circulator of booster 25-2 separates the channels according to their direction. The grid-1 channels are output at port j' and directed to a C-dual amplifier BB 20, that amplifies channels presented to port a and output them at port b. A grid-1 filter 45 is connected between the East output of amplifier 20 and booster 25-1, for attenuating any grid-2 channels and transmitting grid-1 channels. Booster amplifier 25-1 provides the boosted grid-1 channels on fiber 2'. The dual amplifier 20 in this configuration is a C-band amplifier.

Similarly, circulator of booster 25-1 directs the all grid-2 channels to East port b of dual amplifier BB 20, that amplifies these channels and present them at output port b'. A grid-1 filter 50 is connected between the West output of amplifier 20 and booster 25-2, for attenuating any grid-1 channels and transmitting grid-2 channels. Booster amplifier 25-2 provides the boosted grid-2 channels on fiber 2.

The OSC channels for bidirectional OSC 35 are added/dropped as discussed above.

Figure 11B:
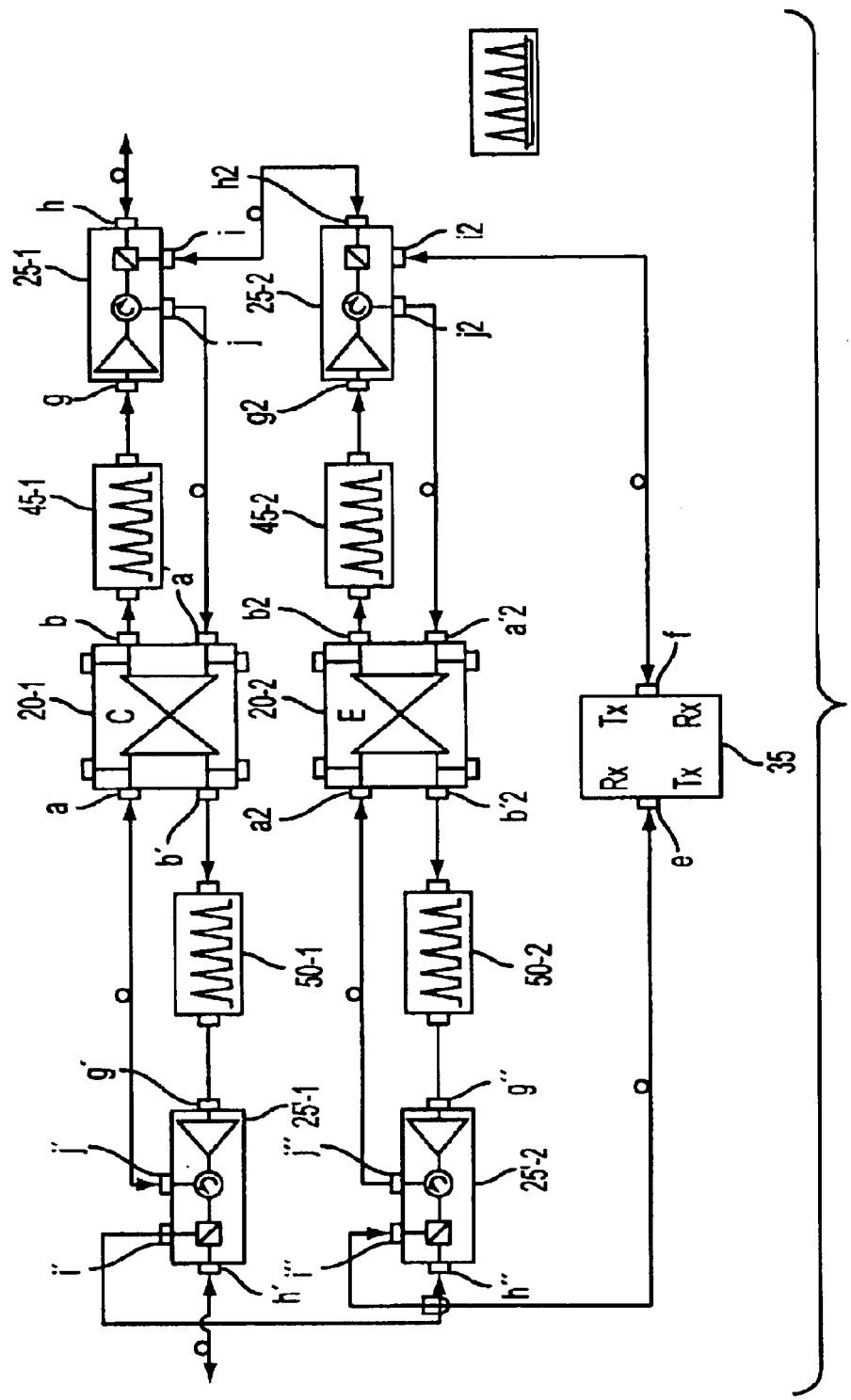
FIG. 11b illustrates another bidirectional amplifier topology.

Interleaved filters can also be used in the E-band, and in the C-band as illustrated in FIG. 11b. This configuration provides for the highest capacity optical amplifier group. The C-band channels are treated separately from the e-band channels. Thus, booster 25'-1, grid-2 filter 50-1, dual amplifier 20-1, grid-1 filter 45-1 and booster amplifier 25-1 are provided for C-band channels, while booster 25'-2, grid-2 filter 50-2, dual amplifier 20-2, grid-1 filter 45-2 and booster amplifier 25-2 are provided for E-band channels. Separation of grid-1 and grid-2 channels from the main signal on fiber 2, 2' is made, for each band, by the circulators of the respective booster amplifiers.

Figure 12A:
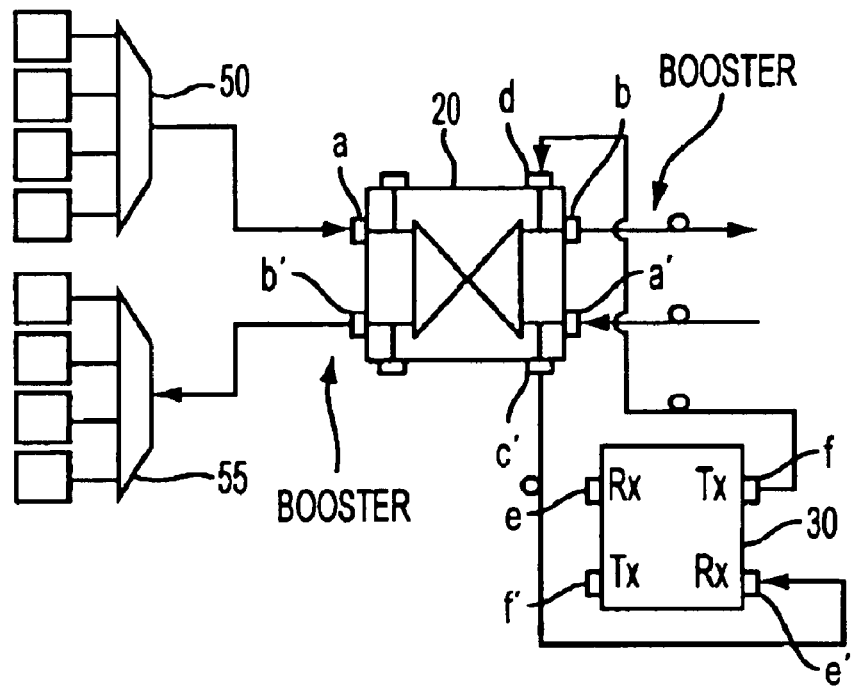
FIG. 12a illustrates a configuration LTE-1 for optical amplification at a line terminating equipment (LTE) site.

FIG. 12a illustrates a first line terminating equipment configuration (LTE-1) for optical amplification at a line terminating equipment (LTE) site. The LTE node comprises a multiplexer 50 for combining four channels in the West-to-East direction, a demultiplexer 55 for separating four channels in the East-to-West direction, and a dual amplifier BB7624 S 20. Dual amplifier BB 20 is used as a post-amplifier placed before the East-bound signals are launched over fiber 2, and as a preamplifier for the East-bound signals. An OSC 30 is connected at add/drop ports d and c'.

This configuration offers a low cost entry solution for optical amplification at LTE sites. The working channel implementation is illustrated using four wavelengths for illustrative purposes only. The actual number of wavelengths can be more than 8 in each direction.

The configuration may be upgraded by adding booster amplifiers at the outputs of the dula amplifier, as shown with arrows.

Figure 12B:
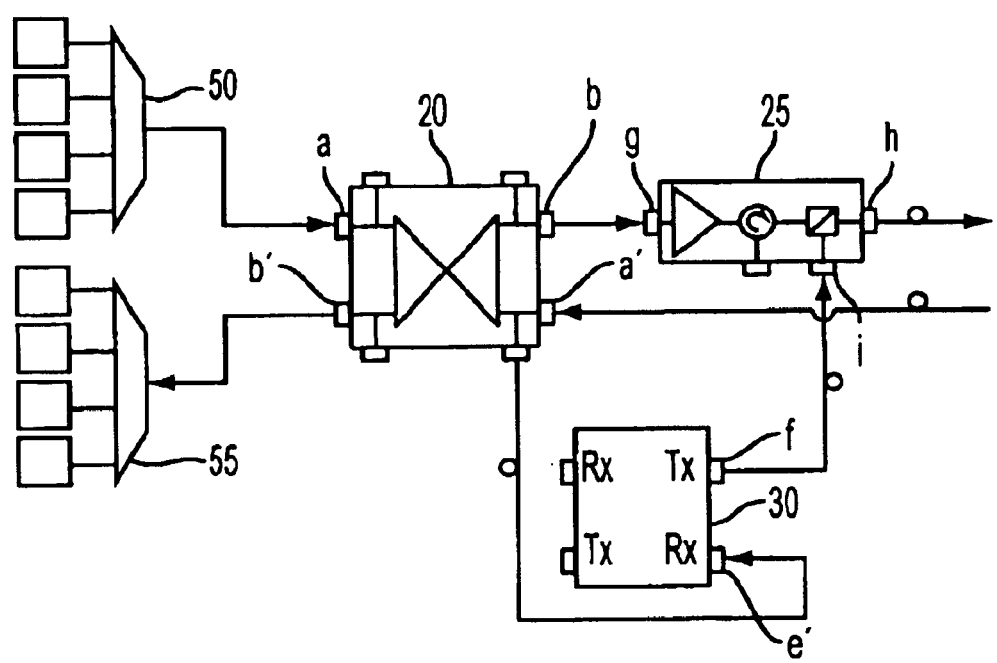
FIG. 12b illustrates a configuration LTE-2, which is an upgrade of configuration LTE-1.

FIG. 12b illustrates a second configuration LTE-2 which is an upgrade of LTE-1. This configuration has the advantage of launching more optical power from the transmitter side than the previous configuration by adding a booster amplifier 30 to the existing dual amplifier 20. This would increase the number of wavelengths the system can accommodate.

Figure 12C:
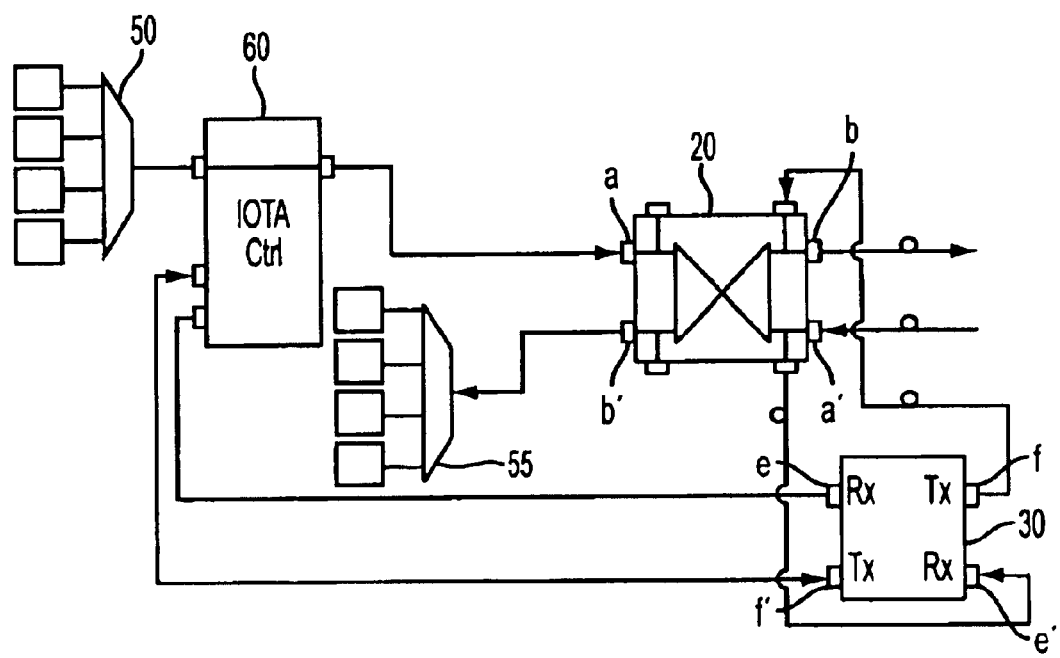
FIG. 12c illustrates a configuration LTE-3 with an intelligent optical terminal accessway (IOTA)

FIG. 12c illustrates a third configuration LTE-3 with an intelligent optical terminal accessway (IOTA) controller 60. The controller 60 is connected between the multiplexer 55 and port a of the dual amplifier BB 20. IOTA 60 is also connected to OSC West of the BB 30, for communication with other nodes of the network.

In addition to the configuration shown in FIG. 12c different power (different number of pumps) booster amplifiers can be used instead, depending on the power requirements.

Figure 13:
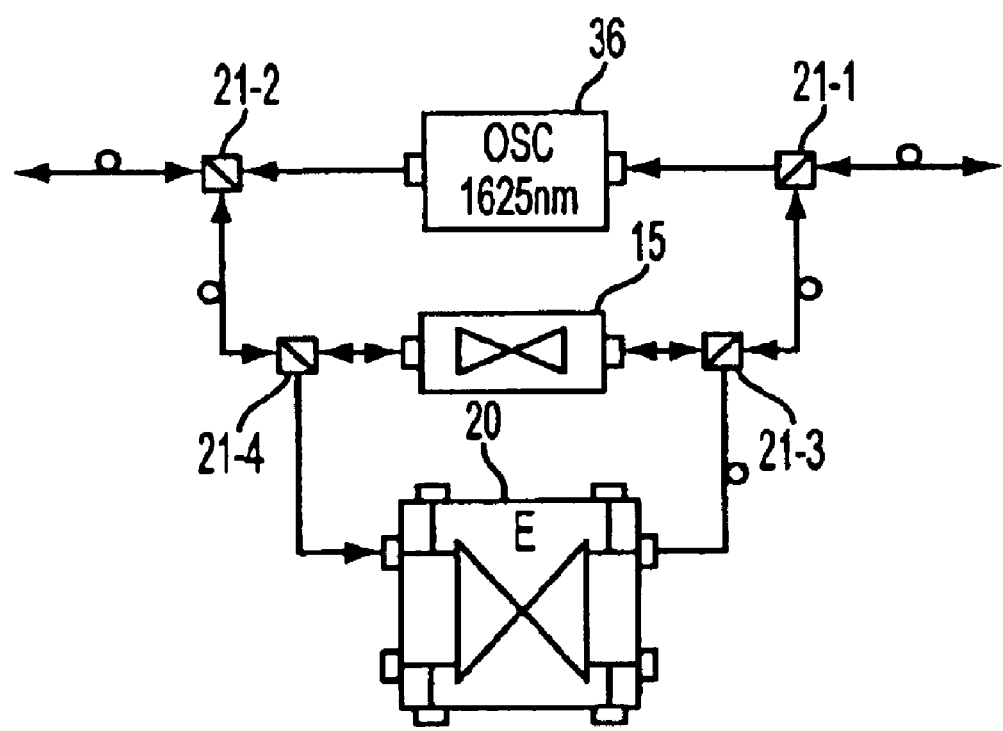
FIG. 13 an upgrade for an existing multiwavelength optical amplifier (MOR)

FIG. 13 illustrates an upgrade for an existing multiwavelength optical amplifier MOR 15. The MOR amplifier 15 can be upgraded with some modules provided herein, in particular with an E-band dual amplifier 20. However, the OSC 36 of the MOR system should be used as the data communication channel. In this hybrid configuration, the modules may reside in a separate bay and may be connect via Ethernet to the MOR 15 bay so that the modules have network visibility.

Figure 14:
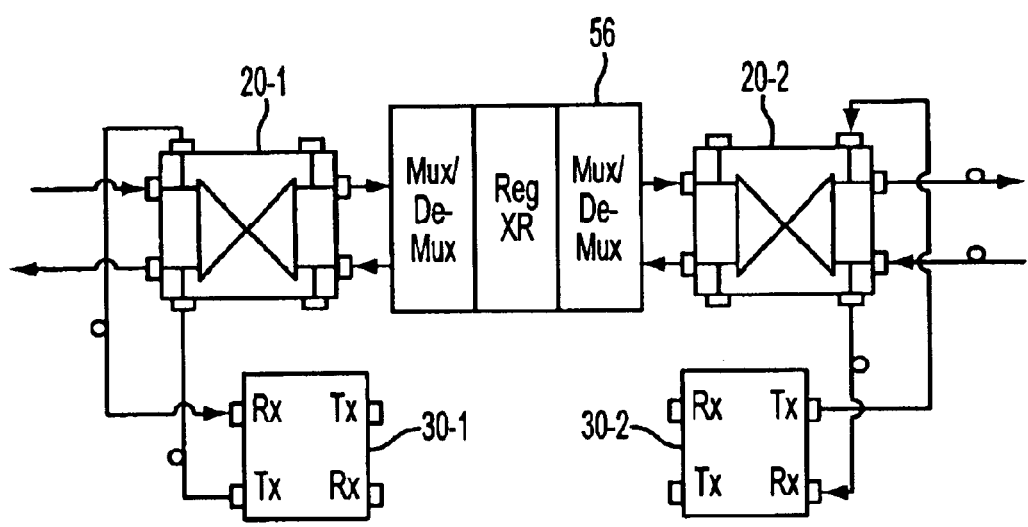
FIG. 14 illustrates a configuration ST-1 for optical amplification at a section terminating equipment (STE) site.

FIG. 14 illustrates a configuration ST-1 for optical amplification at a section terminating equipment (STE) 36. The site comprises a West multiplexer/demultiplexer, a regenerator and a East multiplexer/demultiplexer. The upgrade comprises adding a West dual amplifier 20-1 and an East dual amplifier 20-2, each connected to a respective unidirectional OSC 30-1 and 30-2. This is a low cost configuration, which can be further upgraded to include booster amplifiers.

Again, this configuration assumes unidirectional traffic flow on each fiber. Only the working traffic is presented, since the protection traffic is assumed to have the same implementation from an optical line perspective.

Figure 15:
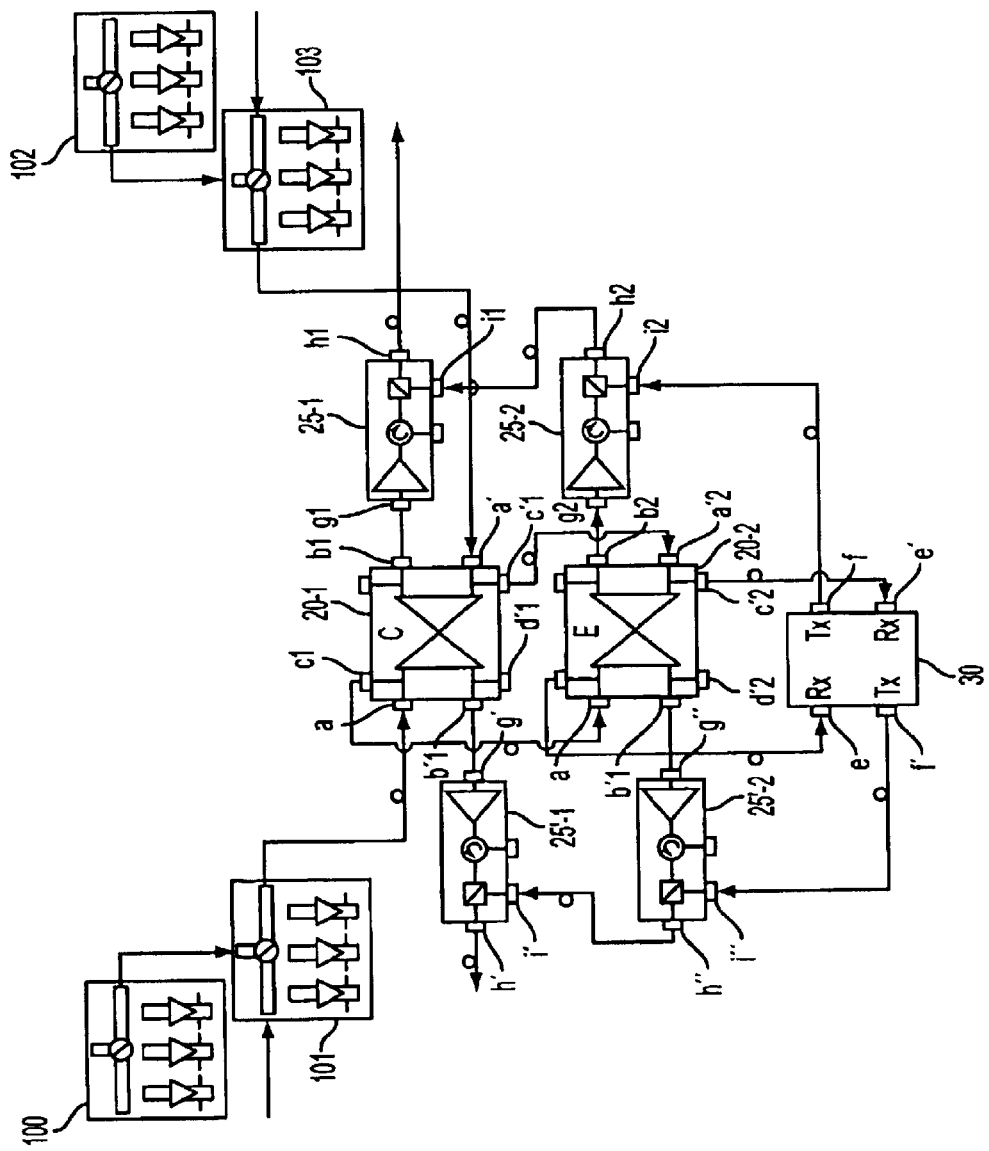
FIG. 15 shows a Raman amplifier evolved from a C and E band dual amplifier BB in a unidirectional overlay.

As seen in connection with FIG. 10A, a configuration with C-band and E-band EDFAs provides a usable gain bandwidth of over 60 nm, which allows amplification of 80 λ at 100 GHz spacing. FIG. 15 illustrates how the number of wavelengths can be further increased to 160 λ at 50 GHz spacing. The target is to double the capacity/reach of the system with a 1.5 cost increase.

FIG. 15 shows Raman pump modules 100–103. The Raman gain effect is an interaction between light and molecular vibrations (in this case of Silicon and Oxigen ions in the glass), which is used to make an optically-pumped optical amplifier. To amplify the signal using Raman gain, a pump signal, whose wavelength is less than the wavelength of all components of the DWDM signal, is pumped into the optical fiber in a direction against the traffic. The pump amplifies the DWDM signal, and thus offsets the insertion loss.

Raman pumping is very efficient, so that required pump powers are readily obtained from semiconductor laser diodes of commercial design. In typical fibers, a factor of 10 amplification would require 1 W of pump power and a fiber 1 km long. Raman pumping retains the advantages that led to adoption of the EDFA for use in 1550 nm systems. Also, the Raman passband is of sufficient breadth for simultaneous amplification of member channels. Furthermore, Raman amplification is relatively uniform across the band. In the configuration of FIG. 15, the pumps operate at various wavelengths between 1460 nm and 1490 nm.

The system of FIG. 15 generally operates in a similar way with the system shown in FIG. 10a. The difference is that the multichannel signal received at West input port a of amplifier 20-1 is amplified before arrival using Raman pumps 100 and 101. Similarly, the at East input port a' of amplifier 20-1 is amplified before arrival using Raman pumps 102 and 103

The booster amplifiers at a respective East and West output are connected in series and operate as disclosed above. The unidirectional OSC BB 30 is connected at the drop ports of the E-band amplifier, and at the add ports of the respective booster amplifiers 25-2 and 25'-2.

We claim:

1. An optical amplification system comprising:
   a dual optical amplifier building block for bidirectional amplification of a plurality of optical channels propagating along a first and a second transmission line;
   an optical service channel (OSC) building block operatively connected to said dual optical amplifier building block for transmitting and receiving service information over a first and a second service channel; and
   a first Raman source of optical power connected at the input of said dual optical amplifier on said first transmission line for back pumping light.

2. A system as claimed in claim 1, further comprising a second Raman source of optical power connected at the input of said dual optical amplifier on said second transmission line for back pumping light.

3. A system as claimed in claim 2, wherein each said first and second Raman source comprises a plurality of pumps at distinct pump wavelengths, lower than the wavelength of the transmission channels.

4. A system as claimed in claim 3, further comprising a first booster optical amplifier building block connected on said first transmission line at a first output of said dual optical amplifier building block, and a second booster optical amplifier building block connected on said second transmission line at a second output of said dual optical amplifier building block.

5. A system as claimed in claim 3, further comprising a first dispersion compensation module connected between said first output and said first booster optical amplifier building block, and a second dispersion compensation module connected between said second output and said second booster optical amplifier building block.

6. An optical amplification system comprising:
   a dual optical amplifier building block for bidirectional line amplification of a plurality of optical channels propagating along a first and a second transmission line;
   an optical service channel (OSC) building block operatively connected to said dual optical amplifier building block for transmitting and receiving service information over a first and a second service channel;
   a first booster optical amplifier building block connected on said first transmission line at a first output of said dual optical amplifier building block;

a second booster optical amplifier building block connected on said second transmission line at a second output of said dual optical amplifier building block;

a grid-1 filter, connected between said first output and said first booster optical amplifier building block;

a grid-2 filter, connected between said second output and said second booster optical amplifier building block;

a first Raman source of optical power connected at the input of said dual optical amplifier on said first transmission line for back pumping light; and a second Raman source of optical power connected at the input of said dual optical amplifier on said second transmission line for back pumping light.

7. An optical amplification system comprising:

an optical multiplexer for multiplexing a plurality of optical signals received over a plurality of input transmission lines and providing a forward multichannel optical signal;

a dual optical amplifier building block for amplifying said forward multichannel optical signal and amplifying a reverse multichannel optical signal;

an optical demultiplexer for receiving said reverse multichannel optical signal and separating same into a plurality of optical channels for transmission over a plurality of transmission lines;

an optical service channel (OSC) building block operatively connected to said dual optical amplifier building block for transmitting and receiving service information over an optical service channel; a first Raman source of optical power connected at the input of said dual optical amplifier on said first transmission line for back pumping light; and a second Raman source of optical power connected at the input of said dual optical amplifier on said second transmission line for back pumping light.

\* \* \* \* \*